US007620493B2

(12) United States Patent
Stankiewicz et al.

(10) Patent No.: US 7,620,493 B2
(45) Date of Patent: Nov. 17, 2009

(54) SYSTEM, METHOD AND APPARATUS FOR PROVIDING NAVIGATIONAL ASSISTANCE

(75) Inventors: Brian J. Stankiewicz, Austin, TX (US); Anthony R. Cassandra, Austin, TX (US)

(73) Assignee: The Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 11/449,481

(22) Filed: Jun. 8, 2006

(65) Prior Publication Data
US 2006/0293839 A1 Dec. 28, 2006

Related U.S. Application Data

(60) Provisional application No. 60/689,728, filed on Jun. 10, 2005.

(51) Int. Cl.
*G01C 21/00* (2006.01)
(52) U.S. Cl. .................. 701/207; 701/209; 340/539.13
(58) Field of Classification Search ................. 701/211, 701/217, 209, 207; 340/539.13, 539.11
See application file for complete search history.

(56) References Cited

U.S. PATENT DOCUMENTS

| 4,939,662 | A * | 7/1990 | Nimura et al. ............. 701/211 |
| 6,339,746 | B1 * | 1/2002 | Sugiyama et al. ........... 701/209 |
| 6,581,000 | B2 * | 6/2003 | Hills et al. ................. 701/207 |
| 7,170,412 | B2 * | 1/2007 | Knox et al. ............... 340/572.1 |
| 2003/0014186 | A1 * | 1/2003 | Adams et al. ............. 701/207 |
| 2003/0018430 | A1 * | 1/2003 | Ladetto et al. ............. 701/217 |
| 2004/0068368 | A1 * | 4/2004 | Adams et al. ............. 701/209 |

OTHER PUBLICATIONS

Bentzen, B., & Mitchell, P. (1995). Audible signage as a way finding aid: Verbal landmark versus talking signs. Journal of Visual Impairment & Blindness, 89, 494-505.
Brabyn, J. A., & Brabyn, L. A. (1982). Speech intelligibility of the talking signs. Journal of Visual Impairment and Blindness, 76, 7778.
Burgard, W., Cremers, A., Fox, D., Hahnel, D., Lakemeyer, G., Schulz, D., Steiner, W., & Thrun, S. (1998). The interactive museum tour guide robot. Proceedings of the AAAI Fifteenth National Conference on Artificial Intelligence.
Cassandra, A. R., Kaelbling, L. P., & Littman, M. L. (1994). Acting optimally in partially observable stochastic domains. In Proceedings of the twelfth national conference on artificial intelligence (AAAI94) (vol. 2, pp. 1023-1028). Seattle, Washington, USA: AAAI Press/MIT Press.

(Continued)

*Primary Examiner*—Mark Hellner
(74) *Attorney, Agent, or Firm*—Schwabe, Williamson & Wyatt P.C.

(57) ABSTRACT

The present invention provides a system, method and apparatus to assist a user navigate from a current location to a second location within an environment by determining a distance traveled by the user or from the user to one or more objects. The current location is then identified using the distance and an environment data. Thereafter, a route to the second location is determined based on the current location and the environment data, and a directional cue is provided to the user based on the route. Note that the present invention can be implemented as a computer program embodied on a computer readable medium wherein the steps are performed by one or more code segments.

59 Claims, 10 Drawing Sheets

OTHER PUBLICATIONS

Cassandra, A. R., Littman, M. L., & Zhang, N. L. (1997). Incremental pruning: A simple, fast, exact method for partially observable Markov decision processes. In D. Geiger & P. P. Shenoy (Eds.), Proceedings of the thirteenth annual conference on uncertainity in artificial intelligence (uai-97) (pp. 54-61). San Francisco, CA: Morgan Kaufmann Publishers.

Gillner, S. & Mallot, H. (1998). Navigation and acquisition of spatial knowledge in a virtual maze. Journal of Cognitive Neuroscience, 10 (4), 445463.Golledge, R. G., Klatzky, R. L., Loomis, J. M., Speigle, J., & J., T. (1998). A geographical information system for a gps based personal guidance system. International Journal of Geographical Information Science, 12, 727-749.

Golledge, R. G., et al., "Navigation System for the blind: Auditory display modes and guidance," International Journal of Geographical Information Science (1998), 12:727-749.

Kaelbling, L. P., Cassandra, A. R., & Kurien, J. A. (1996). Acting under uncertainty: Discrete bayesian models for mobile robot navigation. In Proceedings of ieee/rsj international conference on intelligent robots and systems.

Kaelbling, L. P., Littman, M. L., & Cassandra, A. R. (1998). Planning and acting in partially observable stochastic domains. Artificial Intelligence, 101, 99134.

Loomis, J. M., Golledge, R. G., & Klatzky, R. L. (1998). Navigation system for the blind: Auditory display modes and guidance. Presence: Teleoperators and Virtual Environments, 7, 193-203.

Loomis, J. M., Golledge, R. G., & Klatzky, R. L. (2001) Gps based navigation systems for the visually impaired. In W. Barfield & T. Caudell (Eds.), Fundamentals of wearable computers and augmented reality (pp. 429-446). Mahwah, NJ: Lawrence Erlbaum Associates.

Mallot, H. A., & Gillner, S. (2000). Route navigating without place recognition: What is recognised in recognition triggered responses? Perception, 29 (1), 4355.

Marston, J. R., & Golledge, R. G. (1988). Improving transit access for the blind and vision impaired. Intellimotion, Research Updates in Intelligent Transportation Systems, Transit Research Issue, 7 (2), 4-5.

Simmons, R., & Koenig, S. (1995). Probabilistic navigation in partially observable environments. In Fourteenth international joint conference on artificial intelligence (p. 1080-1087). Montreal, Canada: Morgan Kaufmann.

Stankiewicz, B. J., Legge, G. E., & Schlicht, E. J. (2001). The effect of layout complexity on human and ideal navigation performance [abstract]. Journal of Vision, 1(3), 189a.

Stankiewicz, B. J., Legge, G. E., Mansfield, J. S., & Schlicht, E. J. (2004). Lost in virtual space: Studies in human and ideal spatial navigation. J Exp Psychol (2006), 32:688-704.

* cited by examiner ated with adopting the system. For example, the bea-
SYSTEM, METHOD AND APPARATUS FOR PROVIDING NAVIGATIONAL ASSISTANCE

PRIORITY CLAIM

This patent application is a non-provisional application of U.S. patent application 60/689,728 filed on Jun. 10, 2005 entitled System, Method and Apparatus for Providing Navigational Assistance, which is hereby incorporated by reference in its entirety.

STATEMENT REGARDING FEDERALLY SPONSORED RESEARCH OR DEVELOPMENT

This invention was made with government support under R01 DK016089 awarded by The National Institutes of Health. The government has certain rights in the invention.

TECHNICAL FIELD OF THE INVENTION

The present invention relates in general to the field of navigational aids, and more particularly, to a system, method and apparatus for providing navigation assistance through sensory supplementation.

BACKGROUND OF THE INVENTION

Without limiting the scope of the invention, this background is described in connection with navigational aids. Approximately eight million Americans report having some form of low-vision defined by difficulty reading print material in a typical newspaper with corrective lenses (McNeil, 2001). Common causes of low-vision include (but are not limited to) macular degeneration, glaucoma, and diabetic retinopathy. For example, someone who has age-related macular degeneration may loose vision in the central three degrees of their visual field with the remaining portion of their visual field remaining intact. For people with low-vision, independent navigation and way finding remains a challenge.

Indoor pedestrian mobility can be broken down into two fundamental processes: obstacle avoidance and way finding. Obstacle avoidance is the process of maneuvering around objects within the navigator's immediate vicinity. Although obstacle avoidance is a challenge for someone who is blind or has low-vision, typically they can use their residual vision, a long cane, guide dog or a variety of other obstacle avoidance mechanisms to navigate around obstacles. Furthermore, Pelli (1987) investigated the effect of reduced vision on obstacle avoidance behavior and found that even with significant reduction of visual information subjects were able to maneuver around objects with little difficulty.

For most people with vision loss the primary obstacle to independent mobility lies in the problem of wayfinding in an unfamiliar building. Navigating through a familiar building, such as their home, or the building in which they work, does not pose much of a challenge for someone with low-vision. This is because they have generated a cognitive map (Tolman, 1948) of the environment or an internal representation of this large-scale space. The primary challenge lies in when someone with a visual deficit visits an unfamiliar building.

Many research scientists and engineers have recognized the challenges faced by low-vision navigators. Recently with the public use of global positioning system (GPS) signals, researchers have developed navigation aids for outdoor navigation (e.g., Golledge, Loomis, Klatzky, Flury, & Yang, 1991; Golledge, Klatzky, Loomis, Speigle, & J., 1998; Loomis, Golledge, & Klatzky, 2001, 1999). These systems (e.g., GPS and GPS Talk) can be used to localize the user within a large-city, provide instructions to reach a specific destination in addition to providing information about local points of interests (e.g., "the Museum of Modern Art is to your left"). GPS systems have generated a great deal of excitement and have proven to be effective. However, the utility of GPS-based systems ends at the front door of the building due to the fact that GPS signals are typically unavailable indoors.

Many contemporary buildings have been fitted with Braille signs that identify room numbers and other significant landmarks. However, the utility of these signs is marginal given that they are difficult to localize and studies have shown that many low-vision or blind individuals either do not use Braille or cannot read Braille (Blind, 1999; Goldish, 1967). These studies suggests that not only are these low-vision navigation aids awkward, but they may be ineffective for a large portion of the population that they are intended to help.

A low-vision indoor navigation aide has been developed by Loughborough (1979) which has recently been developed into the Talking Signs® system (Brabyn & Brabyn, 1982, 1983). The Talking Signs® system uses beacons that transmit a modulated infrared light signal that generates a continuous signal. The beacon can be placed at a potential indoor destination (e.g., a door or an elevator) outdoor destination (e.g., a bus stop) or even on a moving bus (Marston & Golledge, 1988). The user carries a small hand-held receiver that when pointed in the general direction of the transmitter, translates the modulated infrared light signal into speech output.

Another low-vision navigation aid is the Verbal Landmarks® system, which also uses a series of beacons similar to the Talking Signs® beacons. Verbal Landmarks® beacons use an inductive loop system that is activated when a portable receiver is within range (approximately 5 feet). When activated, a verbal message, the Verbal Landmarks® can be heard, however the Verbal Landmarks® system signal is non-directional, therefore, the auditory messages for the Verbal Landmarks® are usually different than those used for the Talking Signs®. The Talking Signs® typically announce the room number or landmark ("Bus Stop") and allows the user to use this information to navigate. By contrast, the Verbal Landmarks® will give instructions to specific goal states (e.g., "The bathroom is North 5 steps and to the right" as described in, Bentzen & Mitchell, 1995).

Bentzen and Mitchell (1995) investigated the efficacy of Talking Signs® versus Verbal Landmarks® in a real environment (at the Annual Convention for the American Council of the Blind held in a hotel conference center). In these studies, Bentzen and Mitchell (1995) participants were given a collection of routes to follow during the conference. Bentzen and Mitchell (1995) found a significant advantage in both distance traveled and the time to complete the routes for participants that used the Talking Signs® over those that used Verbal Landmarks® The work by Bentzen and Mitchell (1995) showed empirically that Talking Signs® are a more effective system. Although the Talking Signs® low-vision orientation aid performed better than the Verbal Landmarks® system, the Talking Signs® system has not been accepted broadly as a solution to the low-vision wayfinding challenge.

One reason for the lack of adoption may lie in the cost associated with adopting the system. For example, the beacons for the Talking Signs® system cost approximately $2,000 each. If the average building required 250 beacons (the number of beacons installed at the San Francisco City Hall) at $2,000 per beacon, the cost to retrofit an average building would be $500,000. It should be pointed out that for the same amount of money, one could hire a dedicated "low-vision escort" for $25,000 per year who would wait at the front of the building and escort any low-vision visitor to their destination for 20 years before exceeding the cost of the initial installation costs of the Talking Signs®. In order for a low-vision navigation aid to be accepted by the blind and low-vision community, most buildings should possess this technology. In order for a system to be ubiquitous, it must be inexpensive to install and use. The anticipated cost for adopting the system would be negligible from the perspective of building management (on the order of $5,000 to $10,000) and the cost of the handheld navigation system could be on par with a high-end digital magnifier (about $2,000).

As a result, there is a need for a system, apparatus and method of improving navigation for low-vision, blind and potentially, normally sighted users in unfamiliar buildings using a navigation aid that guides and orients a user within an unfamiliar indoor environment and provides instructions to a desired location.

SUMMARY OF THE INVENTION

The present invention provides a system, apparatus and method of improving navigation for low-vision, blind and potentially, normally sighted users in unfamiliar buildings using a navigation aid that guides and orients a user within an unfamiliar indoor environment and provides instructions to a desired location. The navigation aid is designed to work with individuals who are completely blind to those who have significant residual vision. Under some circumstances (i.e., super-complex buildings) the navigation aid disclosed herein will be beneficial for individuals with normal vision (e.g., in emergency situations where vision is obstructed). Low-vision navigation aids of the present invention will find most applicability under these conditions. The present invention satisfies the need for an effective, efficient and affordable low-vision navigation aid that guides and localizes a user within an unfamiliar indoor environment (e.g., an office building or a hospital, etc.) to their goal.

The system, method and apparatus disclosed herein requires minimal infrastructure investment and provides a low-cost navigational aid, while solving problems with the current art. For example, there are no widely accepted systems currently for helping someone with low-vision with the problem of wayfinding. Wayfinding refers to the process of navigating from one location within a large-scale space (e.g., building or a city) to another, unobservable, location. It is different than the problem of obstacle avoidance where a long cane or guide dog can be used to navigate around a local obstacle.

The present invention provides a system to assist a user to navigate from their current unspecified location to a second location within an environment. The system includes one or more distance determination devices, a memory containing environment data, user interface and a processor communicably coupled to the one or more distance determination devices, the memory and the user interface. The processor or distance determination device measures the distance traveled by the user or from the user to one or more objects via the distant determination devices, identifies the current location using the distance and the environment data (i.e., determines the locations where the measurements could be taken), determines a route to the second location based on the current location and the environment data, and provides a directional cue (verbal or otherwise) to the user based on the route via the user interface.

The present invention also provides a method for assisting a user to navigate from their location to a second location within an environment by determining a distance traveled by the user or from the user to one or more objects. The user's location is identified using the distance in conjunction with the environment data. Thereafter, a route to the second location is determined based on the current location and the environment data, and a directional cue is provided to the user based on the route. Note that the present invention can be implemented as a computer program embodied on a computer readable medium wherein the steps are performed by one or more code segments.

The present invention is described in detail below with reference to the accompanying drawings.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
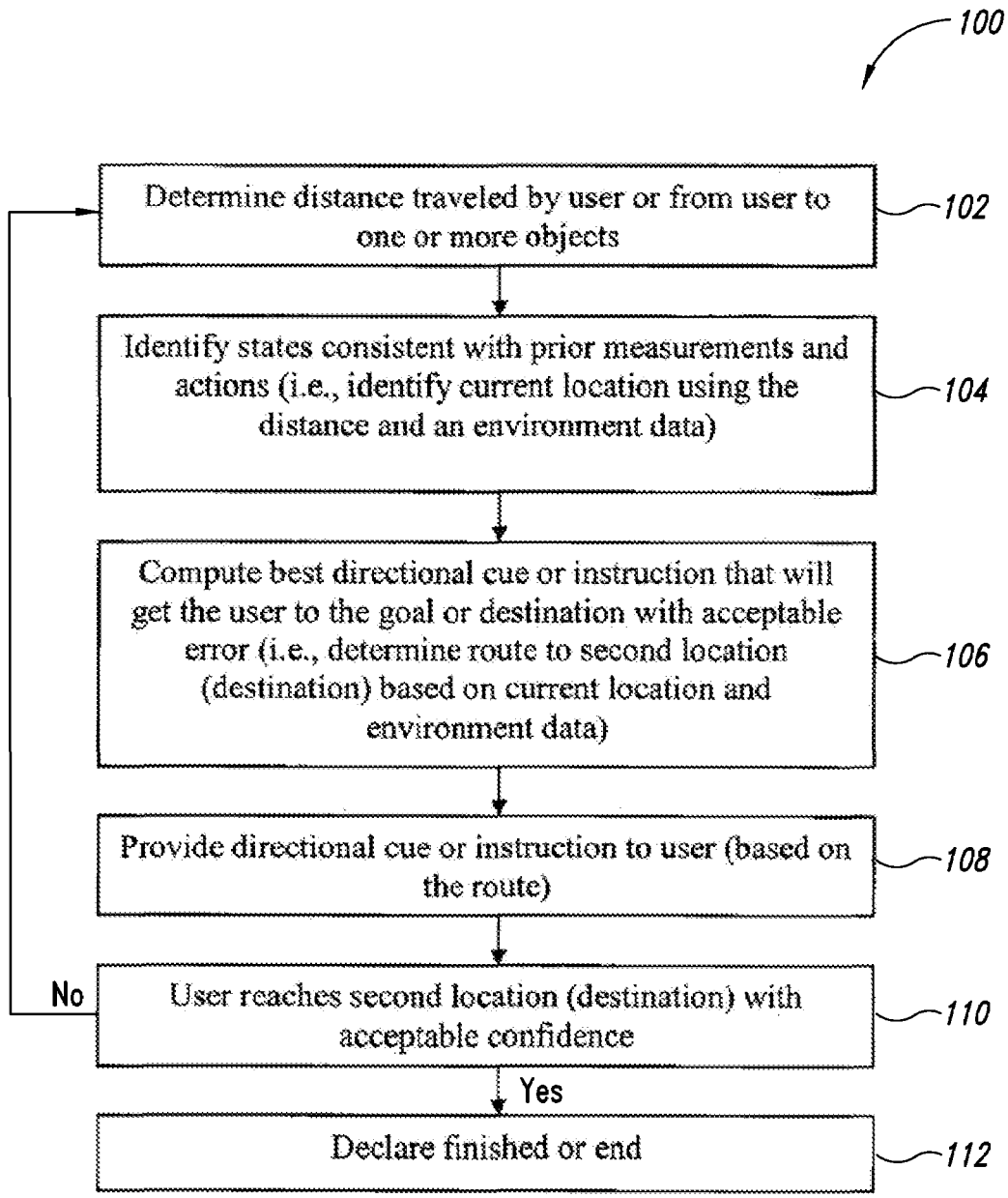
FIG. 1 depicts a method for providing navigational assistance in accordance with the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "distance determination device" is used to describe an electronic device capable of measuring the distance between itself and an object or obstruction (e.g., a wall, door, etc.) or a device that can measure the distance that the user has traveled. These devices typically use a laser, sound waves, light waves, electromagnetic waves, accelerometers or other detection methods known in the art. In addition, the term "NavAid" is used herein to describe an apparatus, system and method intended for low-vision people to use when navigating in an unfamiliar, large-scale environments (e.g., hospitals, university buildings, hotels, parks, gardens, museums and the like). Moreover, various abbreviations are used herein: Normal Vision (NV); Simulated Low-vision (SLV); Simulated Low-vision+NavAid (SLV+NA); Simulated Low-vision+Simulated Talking Signs (SLV+TS); global positioning system (GPS); and Partially Observable Markov Decision Process (POMDP).

The present invention provides a system, apparatus and method of improving navigation for low-vision, blind and potentially, normally sighted users in unfamiliar buildings using a navigation aid that guides and orients a user within an indoor environment and provides instructions reach to a desired goal location. The navigation aid is designed to work with individuals who are completely blind to those who have significant residual vision. Under some circumstances (i.e., super-complex buildings) the navigation aid disclosed herein will be beneficial for individuals with normal vision, e.g., in emergency situations were vision is obstructed. Low-vision navigation aids of the present invention will find most applicability under these conditions. The present invention satisfies the need for an effective, efficient and affordable low-vision navigation aid that guides and localizes a user within an unfamiliar indoor environment (e.g., an office building or a hospital, etc.) to their goal.

The system, method and apparatus disclosed herein requires minimal infrastructure investment and provides a low cost navigational aid, while solving problems with the current art. For example, there are no widely accepted systems currently for aiding helping someone with low-vision with the problem of way finding. Wayfinding refers to the process of navigating from one location within a large-scale space (e.g., building or a city) to another, unobservable, location. It is different than the problem of obstacle avoidance where a long cane or guide dog can be used to navigate around a local obstacle.

Now referring to FIG. 1, a method 100 for providing navigational assistance in accordance with the present invention is shown. Method 100 assists user navigation from a current location to a second location, such as an intermediate destination or a final destination, within an environment. A distance traveled by the user or from the user to one or more objects is determined in block 102. Note that using two or three simultaneous measurements to objects in different directions can improve the speed and accuracy of the present invention. The distance determination can be initiated by the user or performed automatically (e.g., continuously, periodically or upon a trigger event, such as pointing the device or stop moving, etc.). The one or more objects may include a first object located forward of the user, a second object located left of the user, and/or a third object located right of the user. The one or more objects can be an obstruction, a curtain, a wall, a door or a window within the environment. The present invention identifies the locations that are consistent with the measurement by referencing the environment data in block 104. In other words, the locations are identified using the distance (s) and an environment data. As will be described below, the set of locations is preferably identified using a POMDP algorithm or variation thereof. Note that other suitable algorithms can be used. The environment data may include a digital map of the environment and other information about the environment (e.g., historical information, delivery information, emergency information, assistance information or information about bathrooms, building leasing, building maintenance, building management, computer access, conferences, dining, elevators, escalators, events, exits, hallways, handicap access, Internet access, meetings, parking, public transportation, rooms, route, rooms, security, stairs, telephones or a combination thereof).

Given the state uncertainty provided after block 104, the present invention computes the best directional instruction or cue that will get the user to the destination or goal with acceptable error in block 106. In other words, a route to the second location is determined based on the current location and the environment data. The directional instruction or cue is provided to the user based on the route in block 108. The directional cue may include an audio cue, a visual cue, a tactile cue or a combination thereof. If the user arrives at the second location with acceptable confidence, as determined in decision block 110, the process ends or is declared finished in block 112. If, however, the user has not arrived at the second location, as determined in decision block 110, the process returns to block 102 where a new distance is measured and the previously described process repeats. Note that the present invention can be implemented as a computer program embodied on a computer readable medium wherein the steps are performed by one or more code segments.

Figure 2:
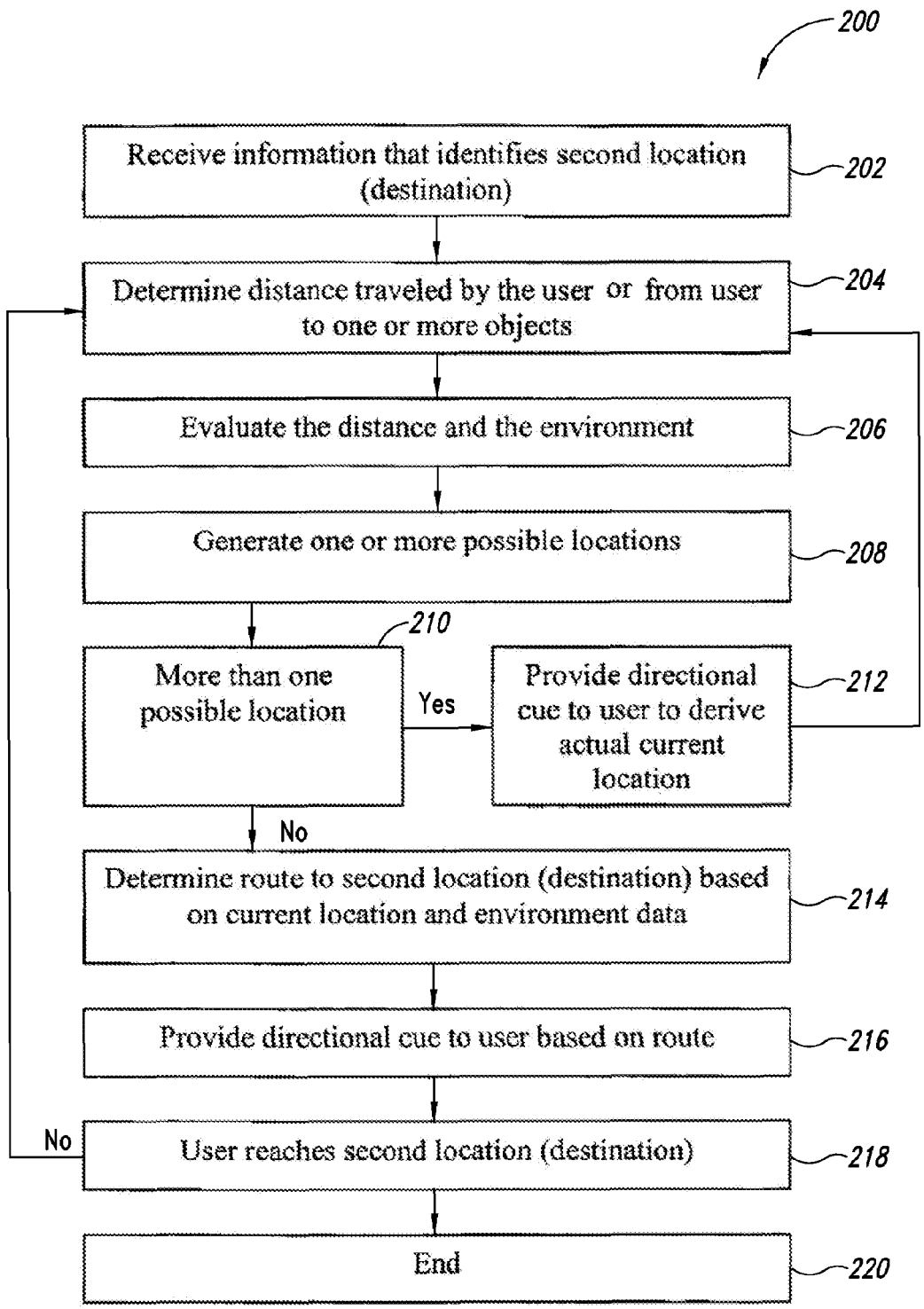
FIG. 2 depicts a method for providing navigational assistance in accordance with another embodiment of the present invention.

Referring now to FIG. 2, a method for providing navigational assistance in accordance with another embodiment of the present invention is shown. Method 200 assists user navigation from a current location to a second location, such as an intermediate destination or a final destination, within an environment. Information that identifies the second location is received in block 202. A distance traveled by the user or from the user to one or more objects is determined in block 204. Note that using two or three simultaneous measurements to objects in different directions can improve the speed and accuracy of the present invention. The distance determination can be initiated by the user or performed automatically (e.g., continuously, periodically or upon a trigger event, such as pointing the device or stop moving, etc.). The one or more objects may include a first object located forward of the user, a second object located left of the user, and/or a third object located right of the user. The one or more objects can be an obstruction, a curtain, a wall, a door or a window within the environment. Note that the invention may determine whether the distance is erroneous (e.g. caused by person in the way, open door, transparent window, etc.).

The current location is then identified using the distance and an environment data in blocks 206-212. As will be described below, the current location is preferably identified using a POMDP algorithm or variation thereof. Note that other suitable algorithms can be used. The environment data may include a digital map of the environment and other information about the environment (e.g., historical information, delivery information, emergency information, assistance information or information about bathrooms, building leasing, building maintenance, building management, computer access, conferences, dining, elevators, escalators, events, exits, hallways, handicap access, Internet access, meetings, parking, public transportation, rooms, route, rooms, security, stairs, telephones or a combination thereof). The process may also include receiving the environment data and/or updating the environment data. The environment data can be stored in a user device, a system within the environment, a guidance server, a portable memory device or a combination thereof.

The distance and the environment data are evaluated in block 206 and one or more possible current locations are generated in block 208. If more than one possible current location is generated, as determined in decision block 210, a directional cue is provided to the user to isolate the actual current location from the multiple possible current locations in block 212. Thereafter, a distance traveled by the user or from the user to one or more objects is determined in block 204 and the process repeats until there is only one possible current location. Once the only one possible current location is generated, as determined in decision block 210, a route to the second location is determined based on the current location and the environment data in block 214, and directional cues are provided to the user based on the route in block 216. The directional cue may include an audio cue, a visual cue, a tactile cue or a combination thereof. If the user arrives at the second location, as determined in decision block 218, the process ends in block 220. If, however, the user has not arrived at the second location, as determined in decision block 218, the process returns to block 204 where a new distance is measured and the previously described process repeats. One or more steps of the present invention can occur on the guidance server. For example, a portion of the route information to reach the second location can be determined by the guidance server after a communication link is established with the guidance server. Note that the present invention can be implemented as a computer program embodied on a computer readable medium wherein the steps are performed by one or more code segments.

Use of the POMDP algorithm will now be described. The low-vision navigation aid of the present invention includes a method to localize and guide the subject from one location within the environment to another using a variation of a robot navigation algorithm that uses partially observable Markov decision processes (POMDP Kaelbling, Cassandra, & Kurien, 1996; Kaelbling, Littman, & Cassandra, 1998; Cassandra, Kaelbling, & Littman, 1994; Stankiewicz, Legge, & Schlicht, 2001). The present invention may use any algorithm that generates an array of possible locations based on an observation and take subsequent observations to determine the location of the user. The POMDP algorithm is an application of Bayes' Rule using the POMDP model parameters and is given by:

$$Pr(b'|b,a,o) = \frac{Pr(o|s',a)\sum_{s} Pr(s'|s,a)Pr(s|b)}{\sum_{s,s''} Pr(o|s'',a)Pr(s''|s,a)Pr(s|b)}$$

As the user executes the suggested navigation commands and takes distance measurements, the belief about their location in the building will change, depending on many factors, such as the likelihood they accurately executed the action and the accuracy of the distance measurement they receive. It is precisely due to the actions and measurements being prone to errors that there is rarely complete certainty about the current location.

The POMDP model predominantly includes conditional probability estimates. One group of conditional probabilities helps to model the movement dynamics, such as the probability of some resulting state s', given the current state is s and action a was taken: i.e., Pr(s'|s, a). The other group of conditional probabilities deals with the measurements, or more generally, the "observations." The probability of some observation o, given that the current state is s' and action a was just completed is modeled: i.e., Pr(o|s', a). The goal of localization is to produce and estimate, b, for the current location, s', given the previous estimate, b, the previous action, a, and the latest observation, o. The derivation and further discussion about this belief state update computation can be found in POMDP related work (Sondik, 1971; Striebel., 1965; Astrom, 1965; Cassandra et al., 1994). Given a particular belief vector over all of the states in the environment, the model needs to compute the best action to generate. The equation below shows the basic form of the value iteration function for choosing the best action. In this function, the model is computing the action a from the set of actions (A) that maximizes the expected value for the current belief b (V(b)). In this function, ρ(b,a) is the immediate reward for generating action a given the current belief b. The model does not just consider the immediate rewards, but also considers the long term rewards. In this function the model computes the likelihood of transitioning from one belief vector (b) to another (b') given that action a is executed (τ(b,a,b')). The model then considers the expected value of being in the new belief state b' (V(b')).

$$V(b) = \max_{a \in A}\left[\rho(b,a) + \sum_{b' \in B} \tau(b,a,b')V(b')\right]$$

In one embodiment, the navigation aid of the present invention includes a laser range finder, a POMDP algorithm implemented on a computer and a digital map of the building. In such a case, the present invention uses measurements taken with the laser range finder from the user's position to the nearest wall in the direction that the user is facing. Using the distance measurement the POMDP algorithm will reference a map of the building or area and compute the locations that the observation (i.e., the distance measurement) could have been taken. Given a collection of locations, the POMDP algorithm computes the optimal action (e.g., rotate by 90°) that will get the user to their goal location using the minimum number of instructions on average. The process may be repeated (i.e., instruction, generate action update spatial uncertainty, compute optimal action) until the user reaches their destination. The present invention is designed to deal with the noise that will be inherent in the measurements taken and the actions generated by a low-vision user.

In a simulated environment, when the user attempts to execute the "move forward 5 feet" action it can be assured that they really do move forward 5 feet. Additionally, a simulation can also ensure that the "second doorway" is never mistaken for the first or third doorway. In a more realistic setting, a navigation system would fail if it assumed that actions succeeded all the time; people may make mistakes and externalities can prevent the successful execution of an action.

It is the POMDP model's ability to capture action uncertainty and errors that make it so well suited to the low-vision navigation task. In the POMDP model, each action is defined to have a set of possible results, incorporating both success and failures. Each item has an associated probability, which models the expected likelihood of that result. Thus, the POMDP model expects there to be errors, and yet can still provide useful localization estimates and navigation commands.

Though there are many sources of measurement errors, a probability distribution over a set of possible measurements may be used to model all sources of measurement errors in a similar manner. This is exactly the model adopted by the POMDP algorithm for handling perceptual errors, and is analogous to the manner in which it models action errors. For example, a hallway that is 40 feet long may return a measurement of 39 or 41 feet, however a measurement of 200 feet may be very unlikely. However, the extreme measurement of 200 feet might be more likely if there is a window or low reflecting surface present. Therefore, the environmental error may be easily modeled. The characterization of the reflective surfaces of typical materials may be recorded or stored so that they may be used by the present invention to accurately determine a good model of expected distance measurements.

To incorporate usage errors, some embodiments of the present invention may have adjustable sensitivity to account for systematic user errors (e.g., allowing the present invention to adapt to their usage patterns, etc.). Other embodiments may incorporate a fuzzy logic algorithm to adjust automatically for user error. Still other embodiments may use the continuous scanning modes of the measurement devices to provide automated assistance in helping the users orient themselves and to aid them in orienting the devices themselves.

In operation the present invention is able to capture a complex, noisy, dynamic environment, which is often a nontrivial process to determine the best action to take for any individual location in the model. Furthermore, the navigation is made significantly more complicated when the navigator is uncertain about their exact location. With location uncertainty, the present invention is required to consider the best action to take from all possible locations the user may be in and then combine the possible location information in some way to come up with a single "best" action. The present invention may create an array of possible actions and select an action from that array.

The present invention must also consider the potential future errors that can arise in the actions and measurements. The POMDP model used in one embodiment of the present invention was developed to solve exactly these types of complex problems. There are mathematical solution procedures that weigh all the information and compute the optimal action policy. Further, the action policy is defined over the belief states, so it does not require complete knowledge of the current location. The present invention may use a variety of algorithms to compute the optimal action policy. The first such "exact," optimal solution algorithm was developed in Sondik (1971), and many subsequent exact, approximate and heuristic algorithms have been developed since (Lovejoy, 1991; Kaelbling et al., 1998, 1996; Cassandra, Littman, & Zhang, 1997).

The present invention may use any algorithm, which provides a mechanism for navigating when there are action and observation errors. However, the algorithm has to be informed about the types of errors that users are likely to encounter. That is, the algorithm needs an estimate of the likelihoods that a user will make a given action given a specific instruction. For example, one study used a series of low-vision subjects and normally sighted subjects in which we will instruct them to make a specific action (e.g., rotate right by 90°). The actual rotation was recorded given the instruction. The results from this study were used to create a model of the action errors produced by a low-vision and normally sighted subject. These estimates were used by the POMDP model to updates its belief vector given an action (i.e., Pr(s'|s,a)).

In operation the present invention, is instructed by the user to take measurements in a certain direction, e.g., down a hallway. It is understood, that pointing is a difficult task for the user and may lead to observation errors in which the user mispoints the laser range finder off a sidewall instead of off the end of the hallway. These observation errors are estimated and provided to the POMDP model by measuring observation accuracies for varying hallway lengths.

The present invention is effective in real environments, which allows the movement to any state within the environment. A low-vision navigation aid is described that uses POMPDP to guide a user who is blind or has low-vision through a novel environment to their destination. The algorithm of the present invention is useful under simulated conditions (e.g., within a virtual environment), and under more complex and realistic conditions (e.g., a real building with dynamic obstructions). The present invention has a number of advantages over existing low-vision, way-finding aids. These include the installation cost, error rates and cost.

In addition, the present invention can be widely adopted with minimal installation costs (low installation and/or retrofitting cost). The current system of the present invention can be built with items that are more or less "off-the-shelf" items. The present invention may be built using a small palm top computer interfaced with a handheld range finder. The system may be adopted by building management systems, the system can have a broad impact for individuals with low-vision who want to navigate through unfamiliar buildings. The primary cost for adopting this system would be in providing a digital map to a centralized database. These maps can be built by taking simple measurements within the building or using a metrically accurate map of the building. In one embodiment, the present invention generates the map using metric maps, however any method may be used to generate a map of the environment so long as the state is identifiable on the map. The hallway within the building may be measured (width and length) and this value used to convert the building map to a metrically precise building map. Software may be used to convert these metric maps to the appropriate data structures for carrying out the POMDP algorithms.

Figure 3:
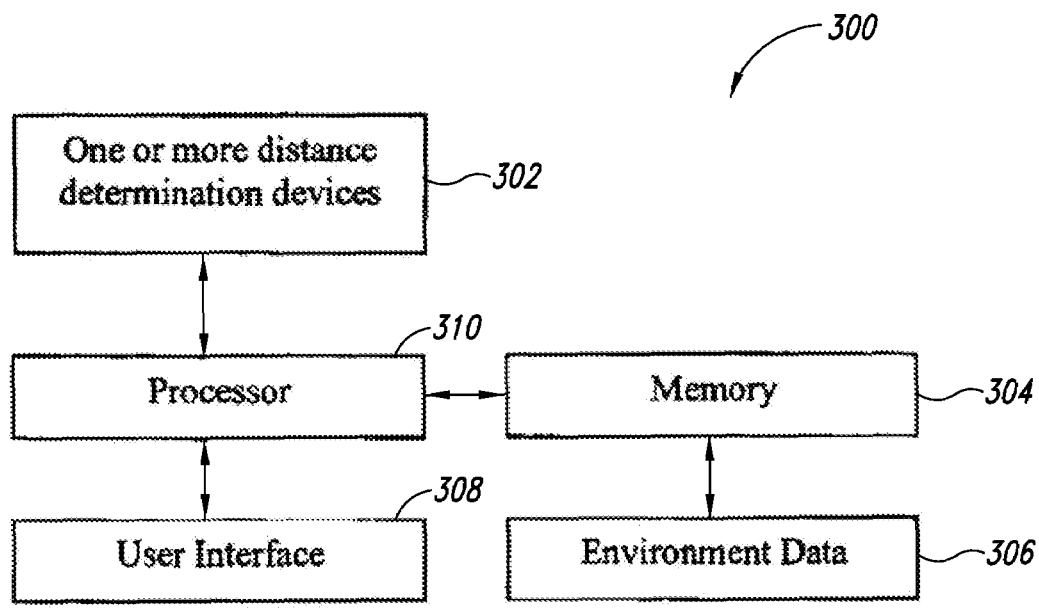
FIG. 3 depicts a block diagram of system or device to provide navigational assistance with one embodiment of the present invention.

Now referring to FIG. 3, a block diagram of system or device 300 to provide navigational assistance with one embodiment of the present invention is shown. The system or device 300 may include one or more distance determination devices 302, a memory 304 containing an environment data 306, a user interface 308 and a processor 310 communicably coupled to the one or more distance determination devices 302, the memory 304 and the user interface 308. The processor 310 determines a distance traveled by the user or from the user to one or more objects via the distant determination devices, identifies the current location using the distance and the environment data, determines a route to the second location (e.g., an intermediate destination, final destination, etc.) within the environment based on the current location and the environment data, and provides a directional cue (e.g., an audio cue, a visual cue, a tactile cue or a combination thereof) to the user based on the route via the user interface 308 (see FIG. 1). The system or device 300 can also perform the method described in FIG. 2 or some variation thereof.

In some embodiments, the system 300 is self-contained or integrated into a handheld device. The system 300 may be at least one of a hand-held device, a device embedded into a briefcase, a device embedded into a purse, a device embedded into a shoe, a device embedded into a hat, a device embedded into a wheelchair, or a device embedded into a wearable object. The system 300 may be partially self-contained and partial at a remote location. This may allow the system 300 be integrated into a network where one unit may be used at a variety of locations and real time upgrades to the database and the location module. In some instances the system 300 may contain one or more batteries to power the system; the batteries may be rechargeable or replicable or a combination thereof.

The one or more distance determination devices provide the present invention with observations about the environment and are typically range finders or pedometers that use a laser, a sound wave, an electromagnetic wave, an accelerometer or a combination thereof to generate a distance measurement that may be in any convenient unit (e.g., feet, inches, meters, centimeters, and the like). The distance determination devices can determine the distance from the user to the one or more objects or the distance that the user traveled following an instruction and provide these measurements to the processor. They may also have a conversion unit that converts the units into usable units. Furthermore, the distance determination devices may be operated continuously, automatically (e.g., specific intervals, etc) or manually by a user. One embodiment of the present invention may use a laser range finder because it typically provides a more accurate measurement and can measure longer distance (e.g., up to 300 feet). However, other embodiments may use other distance measurement devices, e.g., IR, sonar, ultrasonic, visible light, accelerometers or combinations thereof. For each state (s), which is defined by the user's location and heading within the environment there is a corresponding observation (os). These observations are used by the POMDP algorithm to generate an array of possible locations where the user could be located within the environment.

The environment data 306, also referred to as a location database or digital map, correlates the physical location of structures within an area to mathematical coordinates, which are arranged to reference those coordinates. The coordinates may be Cartesian based or any other coordinate type. The location database identifies location information within a building, area or geographic location. The unit may also have a converter to interchange between coordinate types thus allowing the unit to be used on a variety of systems. The digital map may contain information relating to explicit lengths and widths of areas (e.g., hallways, rooms, doorways, atriums, elevator areas, etc.) within the building in addition to making explicit the locations of different rooms, elevators, bathrooms and other potential destinations. The map may also contain information about the particular location. For example, when used in a school, information about the room may be stored on the device for communication with the user (e.g., room description, content description, etc.). In other environments the device may store bus schedules or instructions. In one embodiment, the map is stored on the device in memory. In other embodiments, the map may be stored on a transportable medium so that the map may be accessed by the present invention (e.g., memory stick, floppy disk, jump drive, secure medium, etc.). The map may be accessed through a network communication system. The location database may be located within the handheld unit or remotely stored (e.g., a guidance server, etc.). The location database may also be stored outside the system and loaded onto the system as necessary, e.g., memory card, miniSD, SD, and the like. Combinations of systems may also be used. For example, a general map may be stored on the handheld unit with a more detailed map being stored on a card or a server and being accessed when necessary.

The digital map can be updated to adjust the route information to account for a variety of issues including traffic, area service, construction or any other situation, which may cause a hazard for the individual. Furthermore, the present invention may indicate when it is necessary to change floors or buildings. The route information may take many forms, e.g., navigation from node to node. The route information may also include alternate routes and contain more information than just the route depending on the particular use, e.g., historical facts, facts relates to items along the route, room information, room numbers, room content, existence of elevators, existence of doorways, existence of escalators, etc. This information may be of use to the user in aiding in navigation of the area.

The communications between the various components of system 300 can be through a wired connection, a wireless connection, an optical connection or any other suitable communication interface and medium.

The user interface 308 may include a touch screen, a knob, a pad, a stick, a speaker, a screen, a display, a card, a receiver or a combination thereof. The user interface 308 may be used to indicate or input the desired second location (destination). The method of input may differ between applications. For example, some embodiments may use a vocal command input, while others use a text input, still others may use a selection based input, e.g., button A for room 101. Still others may be inputted via a computer or memory card, e.g., at a helpdesk.

Similarly, the user interface 308 provides the directional cue by converting the route information into one or more stimuli that the user can understand. The most common output will be auditory in nature, where the output is a series of spoken commands or instructions. Other outputs may also be used including visual, e.g., a large arrow directing the user in which direction to proceed. Tactile outputs may also be used, e.g., a movable joystick to indicate the direction, or a localized vibration to indicate the direction of movement. In some instances, the system may use more than one output device, e.g., both auditory and visual outputs may be used, e.g., a vocal instruction coupled with a arrow to indicate the direction of movement. The directional cue will depend on the output module used in the particular application and may include speakers, touch pads, joysticks, knobs, lights, LEDs and a combination thereof The system may include a module to control the interface to the hand held processor to convert the information into a message in a speech format and a module to play the message in the speech format through the speaker. The system may include a module to control the interface to the hand held processor to convert the information into a message in a visual format and a module to play the message in the visual format through a display.

The present invention may also establish a communication link with a guidance server via a transceiver communicably coupled to the processor. In some embodiments one or more steps occur on the guidance server. Similarly, the determination of the route and the environment data 306 can be distributed between the processor and the guidance server. In other embodiments, the database is located in the system, in a guidance server, in an internal memory device, in an external memory device or a combination thereof. Furthermore, at least a portion of the route information to reach a location is determined by the guidance server. In some embodiments, the system of the present invention may integrate other navigation systems as well, e.g., GPS based systems, Talking Signs® or the like.

Figure 4B:
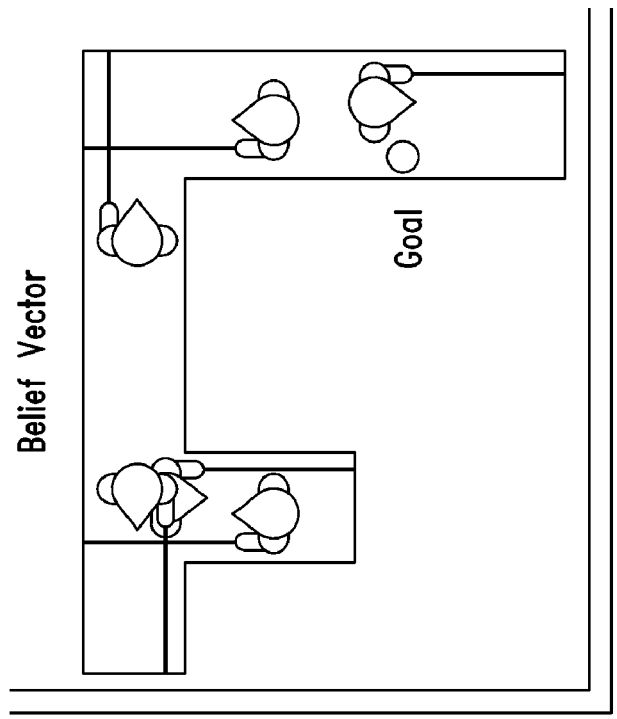
FIGS. 4A, 4B, 4C and 4D are simple schematics of the low-vision navigation system in use.
Figure 4A:
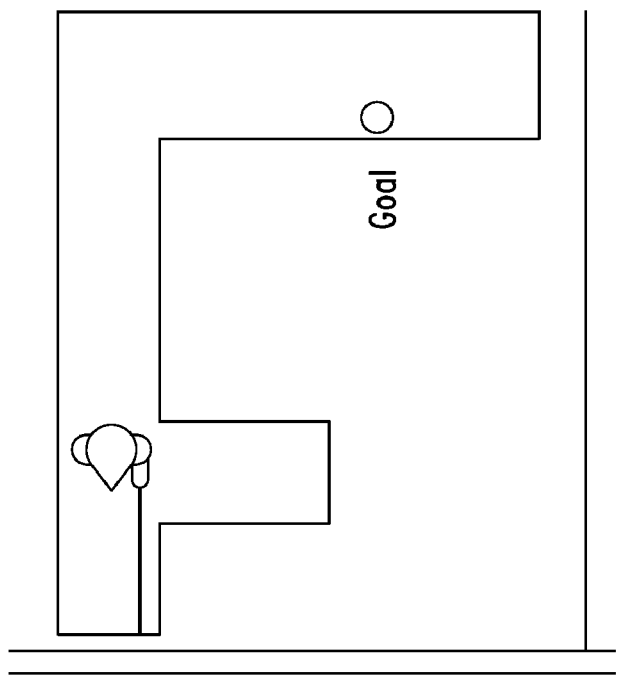

Referring now to FIGS. 4A, 4B, 4C and 4D, simple schematics of the low-vision navigation system in use are shown. As showed in these FIGURES, the observations can be used to generate a hypothesis about the user's current state. In the upper-left image of FIG. 4A, the user is standing at a T-intersection. The "beam" leading from the user to the wall represents a distance measurement from the user to the nearest wall in the direction that the user is facing. The lower-left panel of FIG. 4B is an illustration of where this observation could have been made. The array of states is referred to as a "belief vector," or the set of states that the algorithm "believes" that the user can be located.

Figure 4D:
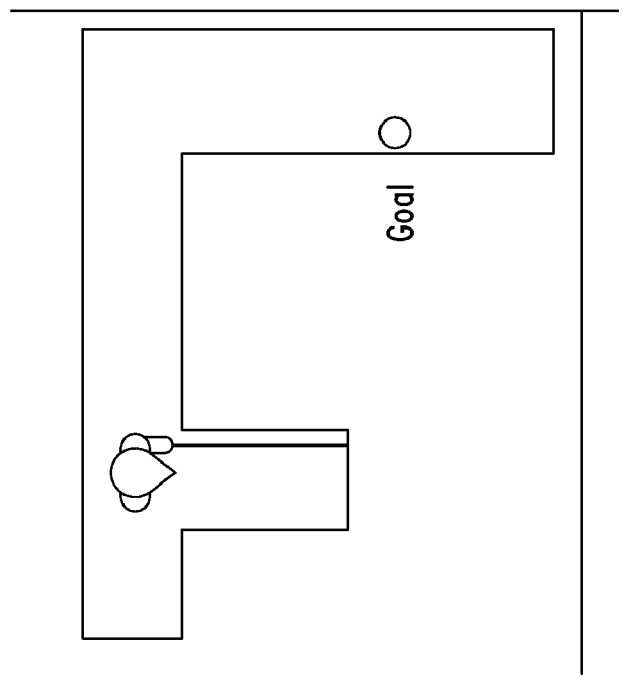
Figure 4C:
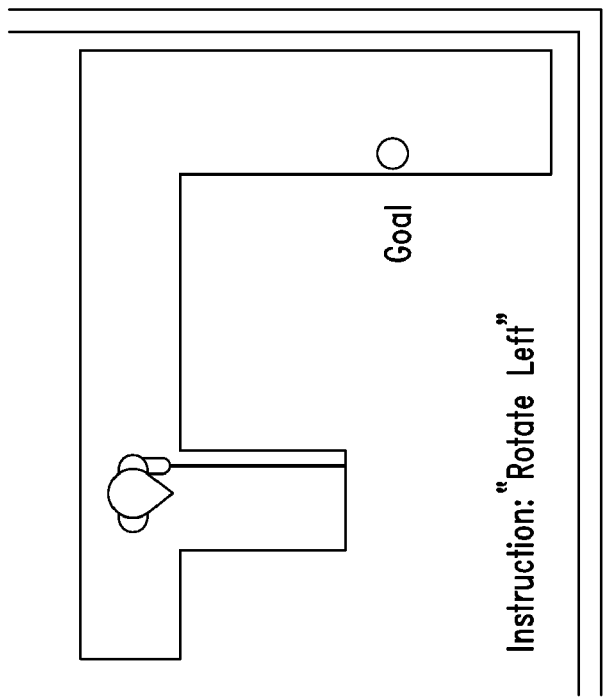

Given the belief vector the present invention will compute the optimal action that will get the user to the goal state with minimal number of instructions on average. In the example provided by FIG. 4C, the instruction is "Rotate-Left." The user then rotates left by 90° and takes a second measurement. The present invention takes the first observation, a 90° rotation and the second measurement to compute the location of the user, there is only one possible location or state. Given the new updated belief vector the present invention again computes the optimal action which is "Rotate-Left." The system continues this process (e.g., Make Observation, Compute Optimal Action, Human Makes action) until the user reaches their goal. FIG. 4D illustrates a simplification to illustrate the use of a single observation to generate an estimate of the user's state in which only positions that are aligned with the four primary directions in the environment (i.e., up, down, left and right) considered.

The present invention may be used to train users in the operation of the present invention and allow for an initial evaluation and development of the user with the device. The scale of complexity may be adjusted from these simple conditions to more realistic and ultimately into real environments. One embodiment of the present invention may be a desktop virtual reality environment in which the subjects moved through the environment by making key presses (e.g., rotate left or right by 90° or translate forward 1 meter).

Figure 5A:
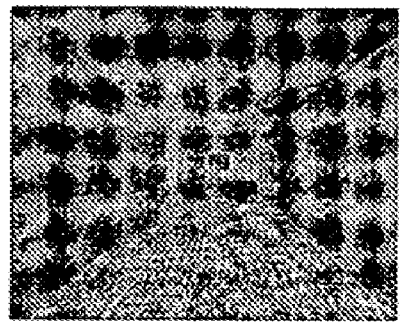
FIG. 5 displays the mean distance for subjects to reach a target location within an unfamiliar environment in the preliminary study (error bars represent 1 SEM)
Figure 5B:
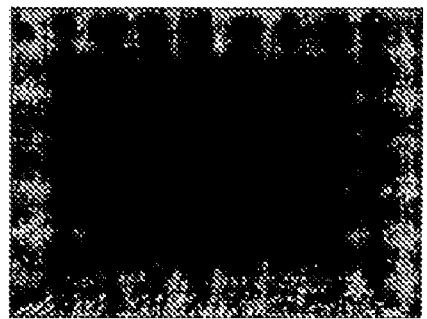
Figure 5C:
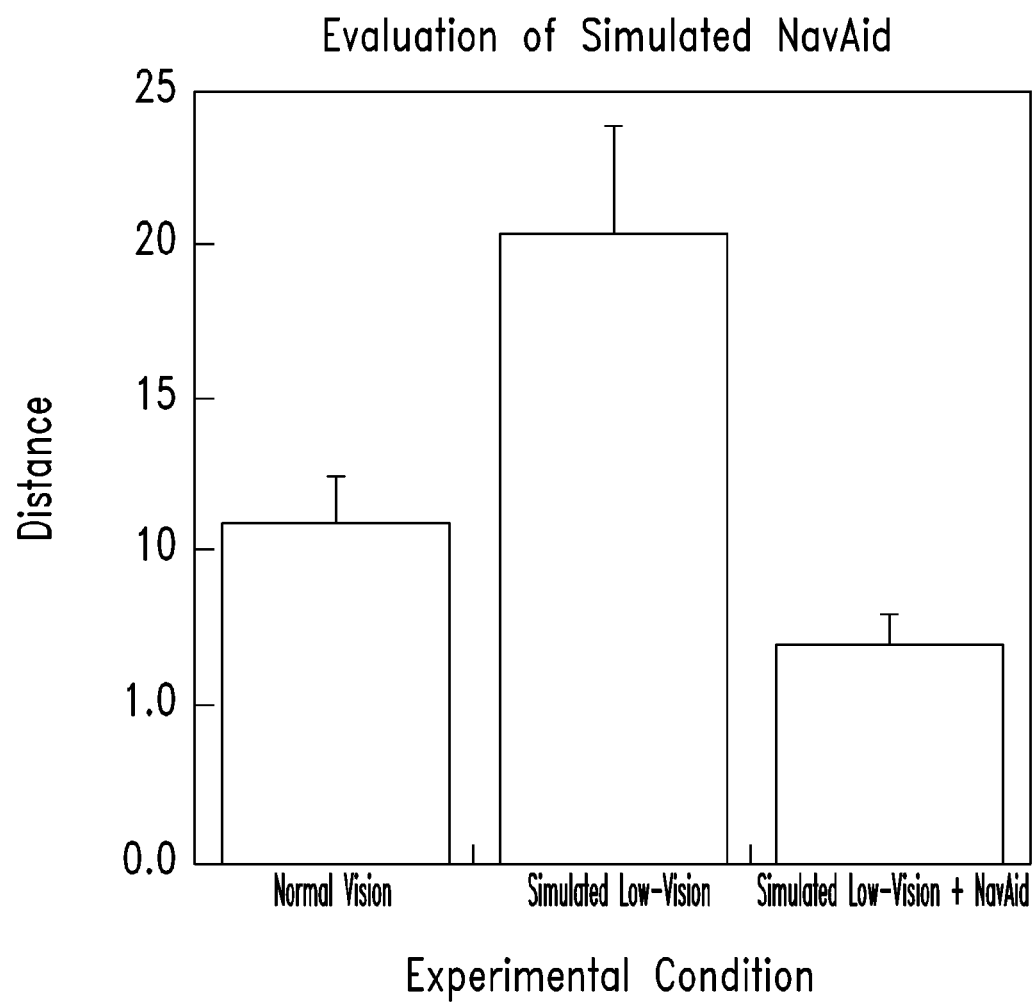

For example, one study used a desktop virtual reality environment in which the subjects moved through the environment by making key presses. The only landmarks within the environments were numbered signs that were placed on each wall. Subjects ran in three conditions: Normal Vision, Simulated Low-vision and Simulated Low-vision+NavAid. In the Normal Vision condition the signs were observable at all times and subjects could see all the way to the end of a corridor. In the Simulated Low-vision condition virtual "fog" was added to the environment to simulate the difficulties associated with identifying distal objects and making distance estimations. FIG. 5A shows the mean distance for subjects to reach a target location within an unfamiliar environment in the preliminary study (error bars represent 1 SEM). FIGS. 5B and 5C illustrates a desktop virtual reality environment. FIG. 5B represents the normal vision where the user may see to the end of the corridor. FIG. 5C represents the simulated low-vision condition through the addition of virtual "fog" to the environment to simulate the difficulties associated with identifying distal objects and making distance estimations The Simulated Low-vision+NavAid condition, was identical to the Simulated Low-vision condition with the exception that there was an additional auditory instruction given by the computer. The NavAid algorithm gave four different instructions: "rotate left," "rotate right," "move forward" and "take a measurement". Subjects were instructed to follow these instructions and that the instructions would ultimately lead the user to their goal. When the subject took a measurement, the computer calculated the distance between the subject's current position and heading to the end of the hallway to update the user's current belief vector.

In the study, each trial started from a random location in the environment and the computer chose a random goal state by specifying a numbered sign that the subject needed to find. FIG. 5C is a graph of the mean distance to reach the goal for each condition. In the study the low-vision navigation condition did make the task much more difficult, as demonstrated by a significant difference between performance in the Normal Vision and the Simulated Low-vision conditions. Additionally, the present invention improved the subject's performance for reaching their goal as demonstrated by a significant improvement in the present invention having condition over the Simulated Low-vision condition. Furthermore, performance in the present invention having condition slightly better than the Normal Vision condition suggesting that the navigation aid may help users navigate with a level of proficiency at or above someone who is normally sighted.

Figure 6:
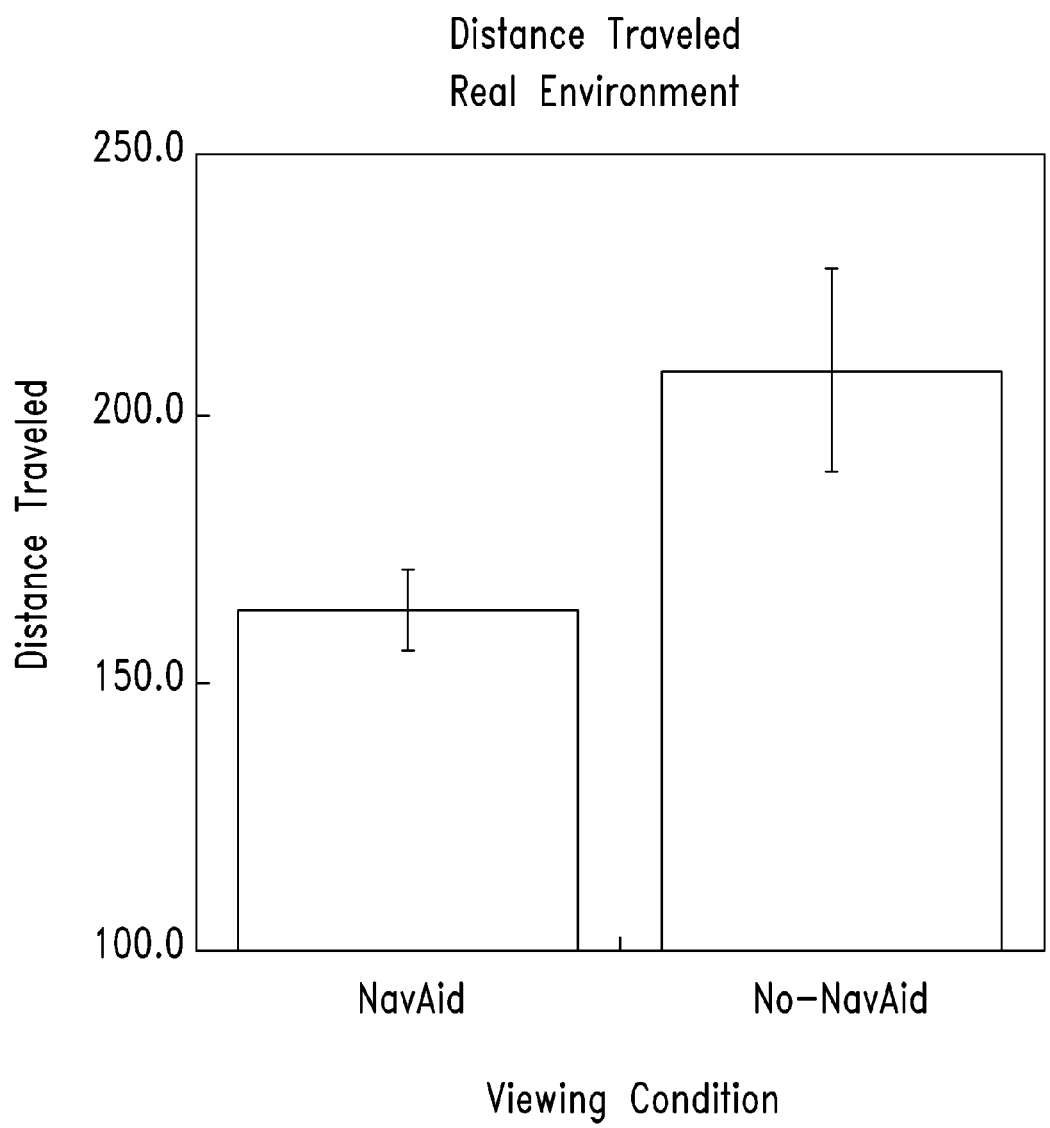
FIG. 6 is a graph illustrating the average distance traveled with and without using the present invention.

In another study, the system was tested in a real buildings on the University of Texas campus. As with the VR study, the efficacy of the NavAid system was evaluated. To do this, subjects were tested using optical systems that degraded the subject's vision. The subjects were then tested on how well they could find a room within the building with the NavAid system versus without the NavAid system. In the No-NavAid condition, subjects were able to get information about the rooms that they were standing near by touching a specific door. When the subject touched the door, the experimenter verbally announced the room number to the subject. This is similar to a subject who uses Braille or even similar to the Talking Signs system. In the NavAid condition, subjects held a laser range-finder and took measurements that were communicated to a laptop computer which announced the appropriate action for the user to make. The subject was instructed to follow the instructions to the best of their ability. FIG. 6 illustrates the average distance traveled in these two conditions. There was a significant improvement in the distance traveled in the NavAid condition than in the No-NavAid condition suggesting that even under the best of navigating conditions, NavAid can reduce the user's distance to reaching a goal.

Figure 7:
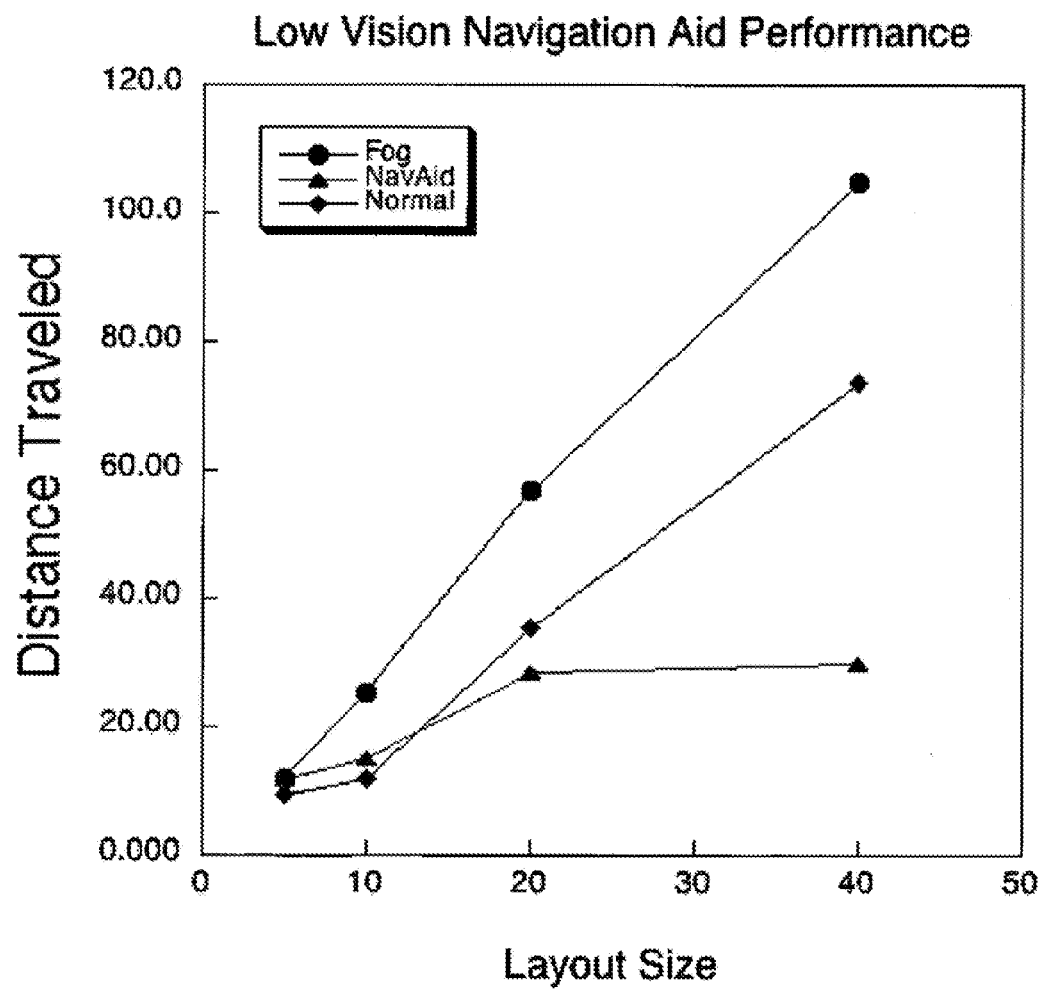
FIG. 7 is a graph illustrating the average distance traveled under various conditions as a function of environment size.
Figure 8:
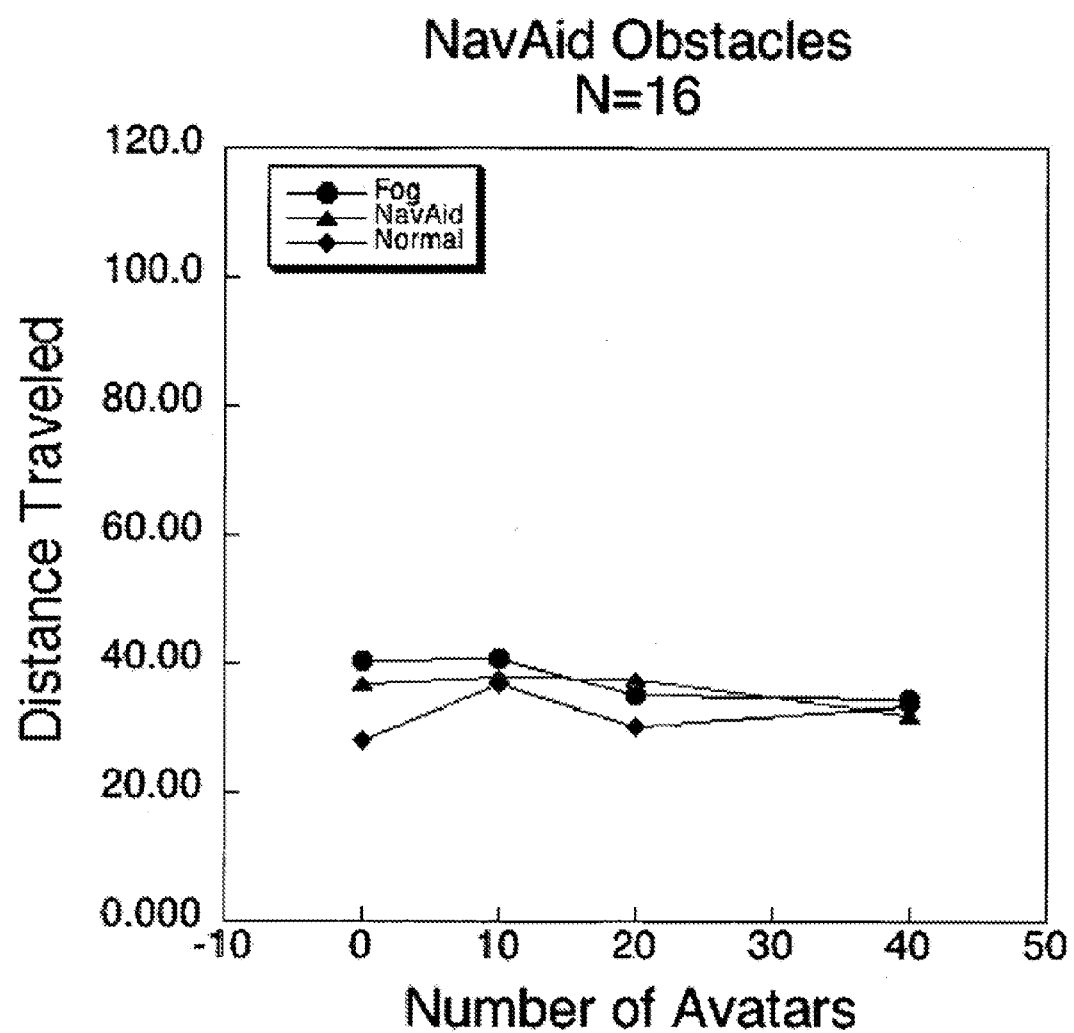
FIG. 8 is a graph illustrating the effect of increasing the number of dynamic obstacles on one embodiment of the present invention.

The initial evaluation of the algorithm of the present invention was conducted within a virtual environment. Evaluating the system within virtual environments allowed environments with parametric values to be generated to evaluate the efficacy of the system under varied conditions (e.g., how effective the system is in continuous space (versus the discrete space used in the preliminary studies), the effect of dynamic obstructions (e.g., pedestrians and/or objects), and the effect of environment size on the efficacy of the system. In these studies, the distance traveled moving through a continuous space was tested using a joy stick. FIG. 7 shows the average distance traveled for the three conditions as a function of environment size. As the environment size becomes larger (i.e., more hallways) the advantage that the NavAid system has over the Simulated Low-vision and Normal Vision condition increases. FIG. 8 shows the effect of increasing the number of dymaic obstacles (pedestrians) on the NavAid algorithm. As the plot shows there increasing the number of dynamical obstacles does not increase the distance traveled to the goal state. This is achieved despite a large number of mis-measurements generated by the user taking measurements off of the dynamic obstacle instead of the distal wall. This result suggests that the system is robust even under the most difficult conditions.

In one set of studies conducted using the present invention, the following general procedures were used. The subjects were run in four conditions: Normal Vision (NV), Simulated Low-vision (SLV), Simulated Low-vision+NavAid (SLV+NA) and Simulated Low-vision+Simulated Talking Signs (SLV+TS). In one example, the studies were conducted in both desktop VR and immersive VR. The purpose of using both desktop and immersive VR was that each approach has counteracting advantages and disadvantages. The desktop VR also allowed the use of environments of arbitrary size; however, the desktop VR has the disadvantage that subjects will not have access to the vestibular and proprioceptive information that they would normally have if they were actually moving through an environment. By contrast, the immersive environment allowed for the use of vestibular information, but the size of the environments that subjects can explore and navigate is limited to the size of the VR arena (20'×20'). The present invention may also use both the desktop VR and the immersive VR to train users in the use of the present invention.

In the virtual reality studies a paradigm similar to that used in the preliminary studies section was be used. In these studies, subjects used a virtual pointer (VP). The VP will be built out of a 3.5"×2"×1.5" block of wood that will have tracking equipment built into it in addition to a button. Other embodiments may use a VP of different sizes (e.g., both larger and smaller versions, etc.) and constructed from different materials (e.g., plastic, metal, polymer, allow, composite, or similar material known to the skilled artisan, etc.). The VP may be held by the subject while they navigate and will serve as a virtual orientation aid.

One embodiment uses the World Viz Precision Point Tracker to locate the user within the environment. The World Viz Precision Point Tracker uses the 6 degrees of freedom associated with where the subject is pointing the virtual handheld navigation aid as they are navigating can be tracked.

The present invention may also allow the user to use both the Talking Signs® and the present invention. While subjects are navigating, they may point the present invention and press the button. If there is a Talking Sign® in the general vicinity and direction that the subject is pointing, then the subject will receive the auditory statement associated with the sign at that location (i.e., the room number). Therefore, the user will also be provided with information from the Talking Signs® system, e.g., directional information.

In another study, the NavAid (SLV+NA) condition are evaluated, the VP is also tracked, but the purpose of the VP is to take a distance measurement to the nearest obstruction in the direction that the subject is pointing. When the computer instructs the user to take a measurement, the subject points the VP as best as they can to the end of the hallway in the direction that they are facing. The computer then computes the closest collision point in the VR environment given the position and orientation of the VP. The VP simulated the range finder that will be used in the present invention.

The present invention also provides a map of the environment. Software may be used to generate a map that generates parameterized indoor environments. These environments are Cartesian-based indoor environments. Cartesian based environments are used for both pragmatic reasons (e.g., most large scale buildings are typically loosely built on a Cartesian principle) and for ecological validity, however other bases may be used. Additionally, other researchers have used environments in which paths intersect at 120° (e.g., Hexatown (Mallot & Gillner, 2000; Gillner & Mallot, 1998)) but these types of environments do not best represent typical large scale buildings.

Another study used four different randomly generated environments that contain 25 hallways. The subjects participated in four conditions described in the General Procedures section (NV, SLV, SLV+TS, SLV+NA). The subjects run in 8 blocks of 50 trials where each block used one of the navigation conditions (NV, SLV, SLV+TS, SLV+NA). Within a block, subjects run in each environment in a random order to prevent incidental learning of the environment during the study. The order of the navigation conditions may counterbalanced across subjects.

The dependent measure in the study is the time and distance traveled to the goal state and a Benefit Score (BS) computed. The Benefit Score is the ratio of performance in the conditions where the orientation devices were used (i.e., the SLV+TS and SLV+NA) versus where they were not used (i.e., SLV). Thus the BS for the Talking signs is computed as: BS(TS)=Perf(SLV+TS)/Perf(SLV) and the BS for the present invention is computed as BS(NA)=Perf(SLV+NA)/Perf(SLV).

A 2 (VR: Desktop, Immersive)×2 (Navigation Aid: TS, NA) Analysis of Variance on the benefit scores was computed. To determine the effect of the environment form the main effect of VR was examined and to determine if there is an effect of the orientation aid the main effect of navigation condition was examined. A comparison between the SLV+TS and the SLV in addition to the SLV+NA and the SLV condition was preformed to determine if there was a significant benefit of using either or both of these orientation aids. A planned comparison study between the SLV+TS and the NV in addition to the SLV+NA and the NV was preformed to determine how performance compares to someone who might have normal vision.

One embodiment of the present invention may include a Leica Disto™ Pro-A handheld range finder with an RS-232 cable connected to a PC laptop. The laptop may be carried in a backpack on the subject. A set of headphones will run from the laptop to the subject so the subject can clearly hear the set of directions given by the present invention. The current apparatus is used for development simplicity.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

REFERENCES

Astrom, K. J. (1965). Optimal control of Markov decision processes with incomplete state estimation. Journal of Mathematical Analysis and Applications, 10, 174205.

Bentzen, B., & Mitchell, P. (1995). Audible signage as a way finding aid: Verbal landmark versus talking signs. Journal of Visual Impairment & Blindness, 89, 494-505.

Blind, A. P. for the (1999). Annual report Oct. 1, 1998 Sep. 30, 1999. Louisville, Ky.: American Printing House for the Blind.

Brabyn, J. A., & Brabyn, L. A. (1982). Speech intelligibility of the talking signs. Journal of Visual Impairment and Blindness, 76, 7778.

Brabyn, L. A., & Brabyn, J. A. (1983). An evaluation of talking signs for the blind. Human Factors, 25, 49-53.

Burgard, W., Cremers, A., Fox, D., Hahnel, D., Lakemeyer, G., Schulz, D., Steiner, W., & Thrun, S. (1998). The interactive museum tour guide robot. Proceedings of the AAAI Fifteenth National Conference on Artificial Intelligence.

Cassandra, A. R., Kaelbling, L. P., & Littman, M. L. (1994). Acting optimally in partially observable stochastic domains. In Proceedings of the twelfth national conference on artificial intelligence (AAAI94) (Vol. 2, pp. 1023-1028). Seattle, Wash., USA: AAAI Press/MIT Press.

Cassandra, A. R., Littman, M. L., & Zhang, N. L. (1997). Incremental pruning: A simple, fast, exact method for partially observable Markov decision processes. In D. Geiger & P. P. Shenoy (Eds.), Proceedings of the thirteenth annual conference on uncertainty in artificial intelligence (uai-97) (pp. 54-61). San Francisco, Calif.: Morgan Kaufmann Publishers.

Gillner, S., & Mallot, H. (1998). Navigation and acquisition of spatial knowledge in a virtual maze. Journal of Cognitive Neuroscience, 10 (4), 445463.

Goldish, L. (1967). Braille in the United States: its production, distribution, and use. American Foundation for the Blind.

Golledge, R. G., Klatzky, R. L., Loomis, J. M., Speigle, J., & J., T. (1998). A geographical information system for a gps based personal guidance system. International Journal of Geographical Information Science, 12, 727-749.

Golledge, R. G., Loomis, J. M., Klatzky, R. L., Flury, A., & Yang, X. (1991). Designing a personal guidance system to aid navigation without sight: progress on the gis component. International Journal of Geographic Information Systems, 5 (373395).

Kaelbling, L. P., Cassandra, A. R., & Kurien, J. A. (1996). Acting under uncertainty: Discrete bayesian models for mobile robot navigation. In Proceedings of ieee/rsj international conference on intelligent robots and systems.

Kaelbling, L. P., Littman, M. L., & Cassandra, A. R. (1998). Planning and acting in partially observable stochastic domains. Artificial Intelligence, 101, 99134.

Loomis, J. M., Golledge, R. G., & Klatzky, R. L. (1999). Navigation system for the blind: Auditory display modes and guidance. Presence: Teleoperators and Virtual Environments, 7, 193-203.

Loomis, J. M., Golledge, R. G., & Klatzky, R. L. (2001). Gps based navigation systems for the visually impaired. In W. Barfield & T. Caudell (Eds.), Fundamentals of wearable computers and augmented reality (pp. 429-446). Mahwah, N.J.: Lawrence Erlbaum Associates.

Loughborough, W. (1979). Talking lights. Journal of Visual Impairment and Blindness, 73, 243.

Lovejoy, W. S. (1991). A survey of algorithmic methods for partially observed Markov decision processes. Annals of Operations Research, 28 (1), 4765.

Mallot, H. A., & Gillner, S. (2000). Route navigating without place recognition: What is recognised in recognition triggered responses? Perception, 29 (1), 4355.

Marston, J. R., & Golledge, R. G. (1988). Improving transit access for the blind and vision impaired. Intellimotion, Research Updates in Intelligent Transportation Systems, Transit Research Issue, 7 (2), 4-11.

McNeil, J. (2001). Americans with disabilities: 1997 (Current Population Reports No. P7061). U.S. Government Printing Office, Washington, D.C.

Pelli, D. G. (1987). The visual requirements of mobility. In G. C. Woo (Ed.), Low vision: Principles and application (p. 134146). New York: SpringerVerlag.

Simmons, R., & Koenig, S. (1995). Probabilistic navigation in partially observable environments. In Fourteenth international joint conference on artificial intelligence (p. 10801087). Montreal, Canada: Morgan Kaufmann.

Sondik, E. (1971). The optimal control of partially observable markov decision processes. Ph.d. thesis, Stanford University.

Stankiewicz, B. J., Legge, G. E., Mansfield, J. S., & Schlicht, E. J. (2004). Lost in virtual space: Studies in human and ideal spatial navigation. Under Revision.

Stankiewicz, B. J., Legge, G. E., & Schlicht, E. J. (2001). The effect of layout complexity on human and ideal navigation performance [abstract]. Journal of Vision, 1(3), 189a.

Striebel., C. T. (1965). Suffcient statistics in the optimal control of stochastic systems. Journal of Mathematical Analysis and Applications, 12, 576592.

Tolman, E. (1948). Cognitive maps in rats and men. The Psychological Review, 55(4), 189-208.

What is claimed is:

1. A system to assist a user with low-vision to navigate from a current location to a second location within an indoor environment, the system comprising:
    a distance determination device suitable for use within the indoor environment;
    a memory containing an environment data of the indoor environment;
    a user interface suitable for use by the user with low-vision; and
    a processing unit communicably coupled to the distance determination device, the memory, and the user interface, wherein the processing unit is configured to
        determine, via the distance determination device, a distance traveled by the user in the indoor environment or from the user to one or more objects in the indoor environment;
        identify a current location in the indoor environment using the distance and the environment data;
        determine a route in the indoor environment to the second location based on the current location and the environment data; and
        provide via the user interface, a directional cue to the user with low-vision based on the route;
    wherein the distance determination device determines the distance, at least in part, by transmitting and receiving a signal to be reflected from the one or more objects and then returned to the distance determination device, and wherein the signal received is a substantially same signal as the signal transmitted.

2. The system of claim 1, wherein the distance determination device is configured to use a laser, a sound wave, an electromagnetic wave, an accelerometer, or a combination thereof.

3. The system of claim 1, wherein the distance determination device comprises one or more range finders, a pedometer, or a combination thereof.

4. The system of claim 1, wherein the distance determination device, the memory, the user interface, and the processor are integrated into a single device.

5. The system of claim 1, wherein the distance determination device is configured to determine the distance and provides the distance to the processor.

6. The system of claim 1, wherein information to identify the second location is received via the user interface.

7. The system of claim 1, wherein the processing unit is configured to determine whether the distance is erroneous.

8. The system of claim 1, wherein the determination of the distance is initiated by the user via the user interface, performed continuously, or performed periodically.

9. The system of claim 1, wherein the processing unit is configured to use a POMDP algorithm to identify the current location.

10. The system of claim 1, wherein the processing unit is configured to identify the current location by:
    evaluating the distance and the environment data;
    generating one or more possible current locations in the indoor environment; and
    providing a directional cue to the user, determining a distance traveled by the user in the indoor environment or from the user to one or more objects in the indoor environment, and repeating the evaluating and generating steps whenever more than one possible current location is generated.

11. The system of claim 1, wherein the one or more objects in the indoor environment comprise:
   a first object located forward of the user;
   a second object located left of the user; and
   a third object located right of the user.

12. The system of claim 1, wherein the one or more objects in the indoor environment comprise an obstruction, a curtain, a wall, a door, or a window within the environment.

13. The system of claim 1, wherein the directional cue comprises an audio cue, a visual cue, a tactile cue, or a combination thereof.

14. The system of claim 1, wherein the second location is either an intermediate destination or a final destination within the indoor environment.

15. The system of claim 1, wherein the environment data comprises a digital map of the indoor environment and other information about the indoor environment.

16. The system of claim 1, wherein the other information comprises historical information, delivery information, emergency information, assistance information or information about bathrooms, building leasing, building maintenance, building management, computer access, conferences, dining, elevators, escalators, events, exits, hallways, handicap access, Internet access, meetings, parking, public transportation, rooms, route, rooms, security, stairs, telephones, or a combination thereof.

17. The system of claim 1, further comprising a guidance server communicably coupled to the processing unit.

18. The system of claim 17, wherein at least a portion of the route to the second location is determined by the guidance server.

19. The system of claim 17, wherein the determination of the route and the environment data are distributed between the processing unit and the guidance server.

20. The system of claim 1, wherein the user interface comprises a touch screen, a knob, a pad, a stick, a speaker, a screen, a display, a card, a receiver, or a combination thereof.

21. The system of claim 1, further comprising a transceiver communicably coupled to the processing unit.

22. A method of assisting a user with low-vision to navigate from a current location to a second location within an indoor environment, the method comprising the steps of:
   determining a distance traveled by the user with low-vision in the indoor environment or from the user to one or more objects in the indoor environment, wherein the distance is determined, at least in part, by transmitting and receiving a signal that is reflected from the one or more objects, and wherein the signal received is a substantially same signal as the signal transmitted;
   identifying a current location in the indoor environment using the distance and an environment data of the indoor environment;
   determining a route in the indoor environment to the second location based on the current location and the environment data; and
   providing a directional cue to the user with low-vision based on the route.

23. The method of claim 22, further comprising receiving information to identify the second location.

24. The method of claim 22, further comprising determining whether the distance is erroneous.

25. The method of claim 22, wherein determining the distance is initiated by the user, performed continuously, or performed periodically.

26. The method of claim 22, wherein the current location is identified using a POMDP algorithm.

27. The method of claim 22, wherein identifying the current location in the indoor environment comprises:
   evaluating the distance and the environment data;
   generating one or more possible current locations in the indoor environment; and
   providing a directional cue to the user, determining a distance traveled by the user in the indoor environment or from the user to one or more objects in the indoor environment, and repeating the evaluating and generating steps whenever more than one possible current location is generated.

28. The method of claim 22, wherein the one or more objects in the indoor environment comprise:
   a first object located forward of the user;
   a second object located left of the user; and
   a third object located right of the user.

29. The method of claim 22, wherein the one or more objects in the indoor environment comprise an obstruction, a curtain, a wall, a door, or a window within the environment.

30. The method of claim 22, further comprising notifying the user when traversing to a different floor is required.

31. The method of claim 22, wherein the directional cue comprises an audio cue, a visual cue, a tactile cue, or a combination thereof.

32. The method of claim 22, wherein the second location is either an intermediate destination or a final destination within the indoor environment.

33. The method of claim 22, further comprising receiving the environment data.

34. The method of claim 22, further comprising updating the environment data.

35. The method of claim 22, wherein the environment data comprises a digital map of the indoor environment and other information about the indoor environment.

36. The method of claim 35, wherein the other information comprises historical information, delivery information, emergency information, assistance information or information about bathrooms, building leasing, building maintenance, building management, computer access, conferences, dining, elevators, escalators, events, exits, hallways, handicap access, Internet access, meetings, parking, public transportation, rooms, route, rooms, security, stairs, telephones, or a combination thereof.

37. The method of claim 22, wherein the environment data is stored in a user device, a system within the environment, a guidance server, a portable memory device, or a combination thereof.

38. The method of claim 22, further comprising establishing a communication link with a guidance server.

39. The method of claim 38, wherein identifying and determining a route occur on the guidance server.

40. The method of claim 38, wherein at least a portion of the route information to reach a location is determined by the guidance server.

41. An article of manufacture comprising:
   a computer-readable storage medium;
   a computer program embodied on the computer-readable storage medium, configured to assist a user with low-vision to navigate from a current location to a second location within an indoor environment, the computer program comprising:
   a code segment for determining a distance traveled by the user with low-vision in the indoor environment or from the user to one or more objects in the indoor environment, wherein the distance is determined, at least in part, by transmitting and receiving a signal that is reflected from the one or more objects, and wherein the signal received is a substantially same signal as the signal transmitted;

a code segment for identifying the current location in the indoor environment using the distance and an environment data of the indoor environment;

a code segment for determining a route in the indoor environment to the second location based on the current location and the environment data; and a code segment for providing a directional cue to the user with low-vision based on the route.

42. The article of claim 41, further comprising a code segment for receiving information to identify the second location.

43. The article of claim 41, further comprising a code segment for determining whether the distance is erroneous.

44. The article of claim 41, wherein the code segment for determining the distance is initiated by the user, performed continuously, or performed periodically.

45. The article of claim 41, wherein the current location is identified using a POMDP algorithm.

46. The article of claim 41, wherein the code segment for identifying the current location in the indoor environment comprises:

a code segment for evaluating the distance and the environment data;

a code segment for generating one or more possible current locations in the indoor environment; and a code segment for providing a directional cue to the user, determining a distance traveled by the user in the indoor environment or from the user to one or more objects in the indoor environment, and repeating the evaluating and generating steps whenever more than one possible current location is generated.

47. The article of claim 41, wherein the one or more objects in the indoor environment comprise:

a first object located forward of the user;

a second object located left of the user; and a third object located right of the user.

48. The article of claim 41, wherein the one or more objects in the indoor environment comprise an obstruction, a curtain, a wall, a door, or a window within the environment.

49. The article of claim 41, further comprising a code segment for notifying the user when traversing to a different floor is required.

50. The article of claim 41, wherein the directional cue comprises an audio cue, a visual cue, a tactile cue, or a combination thereof.

51. The article of claim 41, wherein the second location is either an intermediate destination or a final destination within the indoor environment.

52. The article of claim 41, further comprising a code segment for receiving the environment data.

53. The article of claim 41, further comprising a code segment for updating the environment data.

54. The article of claim 41, wherein the environment data comprises a digital map of the indoor environment and other information about the indoor environment.

55. The article of claim 54, wherein the other information comprises historical information, delivery information, emergency information, assistance information or information about bathrooms, building leasing, building maintenance, building management, computer access, conferences, dining, elevators, escalators, events, exits, hallways, handicap access, Internet access, meetings, parking, public transportation, rooms, route, rooms, security, stairs, telephones, or a combination thereof.

56. The article of claim 41, wherein the environment data is stored in a user device, a system within the environment, a guidance sewer, a portable memory device, or a combination thereof.

57. The article of claim 41, further comprising a code segment for establishing a communication link with a guidance server.

58. The article of claim 57, wherein the code segments are executed on the guidance server.

59. The article of claim 57, wherein at least a portion of the route information to reach a location is determined by the guidance server.

* * * * *